US012631100B2

(12) United States Patent　(10) Patent No.:　US 12,631,100 B2
Glaznev et al.　(45) Date of Patent:　May 19, 2026

(54) DEGRADABLE FIBERS FOR WATER SAVINGS IN HYDRAULIC FRACTURING

(71) Applicant: Schlumberger Technology Corporation, Sugar Land, TX (US)

(72) Inventors: Ivan Sergeevich Glaznev, Sugar Land, TX (US); Abdul Muqtadir Khan, Sugar Land, TX (US); Tayeb Khetib, Clamart (FR); Hadjer Khelkhal, Hassi Messaoud (DZ)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/933,831

(22) Filed: Oct. 31, 2024

(65) Prior Publication Data

US 2026/0117634 A1　Apr. 30, 2026

(51) Int. Cl.
| | |
|---|---|
| *E21B 43/26* | (2006.01) |
| *C09K 8/70* | (2006.01) |
| *C09K 8/80* | (2006.01) |
| *E21B 33/138* | (2006.01) |
| *E21B 49/00* | (2006.01) |

(52) U.S. Cl.
CPC ................ *E21B 43/26* (2013.01); *C09K 8/70* (2013.01); *C09K 8/80* (2013.01); *E21B 33/138* (2013.01); *E21B 49/00* (2013.01); *C09K 2208/08* (2013.01)

(58) Field of Classification Search
CPC ........ C09K 8/68; C09K 8/80; C09K 2208/08; C09K 8/74; E21B 43/267; E21B 43/26; E21B 43/261; E21B 33/138; E21B 43/27; E21B 43/025
See application file for complete search history.

(56) References Cited

U.S. PATENT DOCUMENTS

| | | | |
|---|---|---|---|
| 4,848,467 | A | 7/1989 | Cantu |
| 4,957,165 | A | 9/1990 | Cantu |
| 4,986,355 | A | 1/1991 | Casad |
| 7,093,664 | B2 | 8/2006 | Todd |
| 7,228,904 | B2 | 6/2007 | Todd |
| 7,380,601 | B2 | 6/2008 | Willberg |
| 7,398,826 | B2 | 7/2008 | Hoefer |
| 7,565,929 | B2 | 7/2009 | Bustos |
| 7,673,673 | B2 | 3/2010 | Surjaatmadja |
| 8,291,978 | B2 | 10/2012 | Hutchins |
| 8,418,763 | B1 | 4/2013 | Deen |
| 8,448,706 | B2 | 5/2013 | Hughes |
| 8,657,002 | B2 | 2/2014 | Willberg |

(Continued)

FOREIGN PATENT DOCUMENTS

| | | |
|---|---|---|
| AU | 2017218922 A1 | 9/2017 |
| AU | 2019279908 A1 | 1/2020 |

(Continued)

*Primary Examiner* — Zakiya W Bates

(74) *Attorney, Agent, or Firm* — Jeffrey D. Frantz

(57) ABSTRACT

Systems and methods presented herein generally relate to introducing degradable fibers into a clean fluid having no proppants contained therein to produce a fiber-containing fluid, and injecting the fiber-containing fluid into a wellbore extending through a subterranean formation during a pad stage of a hydraulic fracturing operation. In general, the systems and methods presented herein block fluid leak-off flow through walls of fractures created during hydraulic fracturing operations.

15 Claims, 9 Drawing Sheets

(56)                    References Cited

U.S. PATENT DOCUMENTS

| | | | |
|---|---|---|---|
| 8,657,008 B2 | 2/2014 | Harris | |
| 8,794,325 B2 | 8/2014 | Willberg | |
| 8,991,494 B2 | 3/2015 | Willberg | |
| 9,080,440 B2 | 7/2015 | Panga | |
| 9,316,087 B2 | 4/2016 | Boney | |
| 9,441,447 B2 | 9/2016 | Cochran | |
| 9,523,268 B2 | 12/2016 | Potapenko | |
| 9,534,163 B2 | 1/2017 | Abe | |
| 9,631,468 B2 | 4/2017 | Miller | |
| 9,663,706 B2 | 5/2017 | Fu | |
| 9,677,386 B2 | 6/2017 | Nguyen | |
| 9,790,777 B2 | 10/2017 | Nguyen | |
| 10,030,495 B2 | 7/2018 | Litvinets | |
| 10,301,903 B2 | 5/2019 | Payne | |
| 10,435,554 B2 | 10/2019 | Yun | |
| 10,458,197 B2 | 10/2019 | Khatiwada | |
| 10,465,490 B2 | 11/2019 | Collins | |
| 10,550,305 B2 | 2/2020 | Shimaoka | |
| 10,662,748 B2 | 5/2020 | Brannon | |
| 10,669,808 B1 | 6/2020 | Rosenholm | |
| 10,703,955 B2 | 7/2020 | Shimaoka | |
| 10,738,577 B2 | 8/2020 | Varkey | |
| 10,781,679 B2 | 9/2020 | Lecerf | |
| 10,851,283 B2 | 12/2020 | Potapenko | |
| 10,876,042 B2 | 12/2020 | Qu | |
| 10,941,337 B2 | 3/2021 | Collins | |
| 11,225,599 B2 | 1/2022 | Alekseev | |
| 11,345,847 B2 | 5/2022 | Shalagina | |
| 11,365,346 B2 | 6/2022 | Montalvo | |
| 11,396,790 B2 | 7/2022 | Kraemer | |
| 11,434,740 B1 | 9/2022 | Ngyuen | |
| 11,718,777 B2 | 8/2023 | May | |
| 11,773,315 B2 | 10/2023 | Ramesh | |
| 11,795,377 B2 | 10/2023 | Bulova | |
| 11,845,895 B2 | 12/2023 | Montalvo | |
| 2002/0028857 A1 | 3/2002 | Holy | |
| 2003/0002195 A1 | 1/2003 | Sassolini | |
| 2004/0152601 A1 | 8/2004 | Still | |
| 2006/0042797 A1* | 3/2006 | Fredd | E21B 43/26 166/312 |
| 2006/0113077 A1 | 6/2006 | Willberg | |
| 2006/0169449 A1 | 8/2006 | Mang | |
| 2007/0100029 A1 | 5/2007 | Reddy | |
| 2008/0196896 A1 | 8/2008 | Bustos | |
| 2009/0029878 A1 | 1/2009 | Bicerano | |
| 2010/0175878 A1 | 7/2010 | Rispler | |
| 2011/0315402 A1 | 12/2011 | Popov | |
| 2012/0073809 A1 | 3/2012 | Clum | |
| 2012/0285695 A1 | 11/2012 | Lafferty | |
| 2012/0305247 A1 | 12/2012 | Chen | |
| 2012/0329683 A1 | 12/2012 | Droger | |
| 2013/0161003 A1 | 6/2013 | Makarychev-Mikhailov | |
| 2013/0168096 A1 | 7/2013 | Parkhonyuk | |
| 2013/0233558 A1 | 9/2013 | Fu | |
| 2015/0053402 A1 | 2/2015 | Huey | |
| 2015/0166870 A1 | 6/2015 | Jain | |
| 2015/0252660 A1 | 9/2015 | Usova | |
| 2015/0260627 A1 | 9/2015 | Lesko | |
| 2015/0275644 A1 | 10/2015 | Chen | |
| 2015/0315886 A1 | 11/2015 | Potapenko | |
| 2015/0344772 A1 | 12/2015 | Droger | |
| 2015/0361322 A1 | 12/2015 | Fu | |
| 2015/0369027 A1 | 12/2015 | Jones | |
| 2015/0369028 A1 | 12/2015 | Potapenko | |
| 2015/0369029 A1 | 12/2015 | Potapenko | |
| 2016/0108713 A1 | 4/2016 | Dunaeva | |
| 2016/0145483 A1 | 5/2016 | Lecerf | |
| 2016/0168451 A1 | 6/2016 | Potapenko | |
| 2016/0319185 A1 | 11/2016 | Semenov | |
| 2017/0114273 A1 | 4/2017 | Ivanov | |
| 2017/0167222 A1 | 6/2017 | Lee | |
| 2017/0174980 A1 | 6/2017 | Ladva | |
| 2017/0226409 A1 | 8/2017 | Abivin | |
| 2018/0044576 A1 | 2/2018 | Pantsurkin | |
| 2018/0127639 A1 | 5/2018 | Xiang | |
| 2018/0134947 A1 | 5/2018 | Plyashkevich | |
| 2018/0163512 A1 | 6/2018 | Payne | |
| 2018/0187060 A1 | 7/2018 | Okura | |
| 2018/0215995 A1 | 8/2018 | Patil | |
| 2020/0121484 A1 | 4/2020 | Rousseau | |
| 2021/0215026 A1 | 7/2021 | Godoy-Vargas | |
| 2022/0056330 A1 | 2/2022 | Ghebremeskel | |
| 2024/0035373 A1 | 2/2024 | Gizzatov | |

FOREIGN PATENT DOCUMENTS

| | | | | |
|---|---|---|---|---|
| CA | 2659715 A1 | 1/2008 | | |
| CA | 2667156 C | * | 3/2013 | ........... E21B 43/267 |
| CA | 2748930 C | 4/2014 | | |
| CA | 2901434 A1 | 9/2014 | | |
| CA | 2679662 C | 4/2015 | | |
| CA | 2811510 C | 5/2016 | | |
| CA | 2898412 C | 9/2016 | | |
| CA | 2868977 C | 10/2016 | | |
| CA | 2878521 C | 2/2017 | | |
| CA | 2714802 C | 11/2018 | | |
| CA | 2994101 C | 6/2019 | | |
| CA | 2989304 C | 8/2020 | | |
| CA | 2945479 C | 4/2021 | | |
| CA | 3072133 C | 12/2021 | | |
| CA | 2874296 C | 3/2022 | | |
| CA | 2943219 C | 8/2022 | | |
| CA | 3129443 C | 9/2023 | | |
| EP | 2848651 B1 | 12/2017 | | |
| EP | 2884041 B1 | 11/2018 | | |
| EP | 3006537 B1 | 8/2019 | | |
| EP | 3853320 B1 | 10/2023 | | |
| GB | 2528798 B | 4/2017 | | |
| GB | 2541555 B | 7/2021 | | |
| GB | 2548772 B | 3/2022 | | |
| WO | 2010011222 A1 | 1/2010 | | |
| WO | 2012042403 A2 | 4/2012 | | |
| WO | 2012170522 A2 | 12/2012 | | |
| WO | 2012177570 A1 | 12/2012 | | |
| WO | 2013147796 A1 | 10/2013 | | |
| WO | 2014189586 A1 | 11/2014 | | |
| WO | 2015071750 A2 | 5/2015 | | |
| WO | 2016056934 A1 | 4/2016 | | |
| WO | 2016060120 A1 | 4/2016 | | |
| WO | 2016077671 A1 | 5/2016 | | |
| WO | 2016097789 A1 | 6/2016 | | |
| WO | 2016159816 A1 | 10/2016 | | |
| WO | 2016176381 A1 | 11/2016 | | |
| WO | 2016183574 A1 | 11/2016 | | |
| WO | 2017058706 A1 | 4/2017 | | |
| WO | 2018026301 A1 | 2/2018 | | |
| WO | 2018026302 A1 | 2/2018 | | |
| WO | 2022093059 A1 | 5/2022 | | |

* cited by examiner

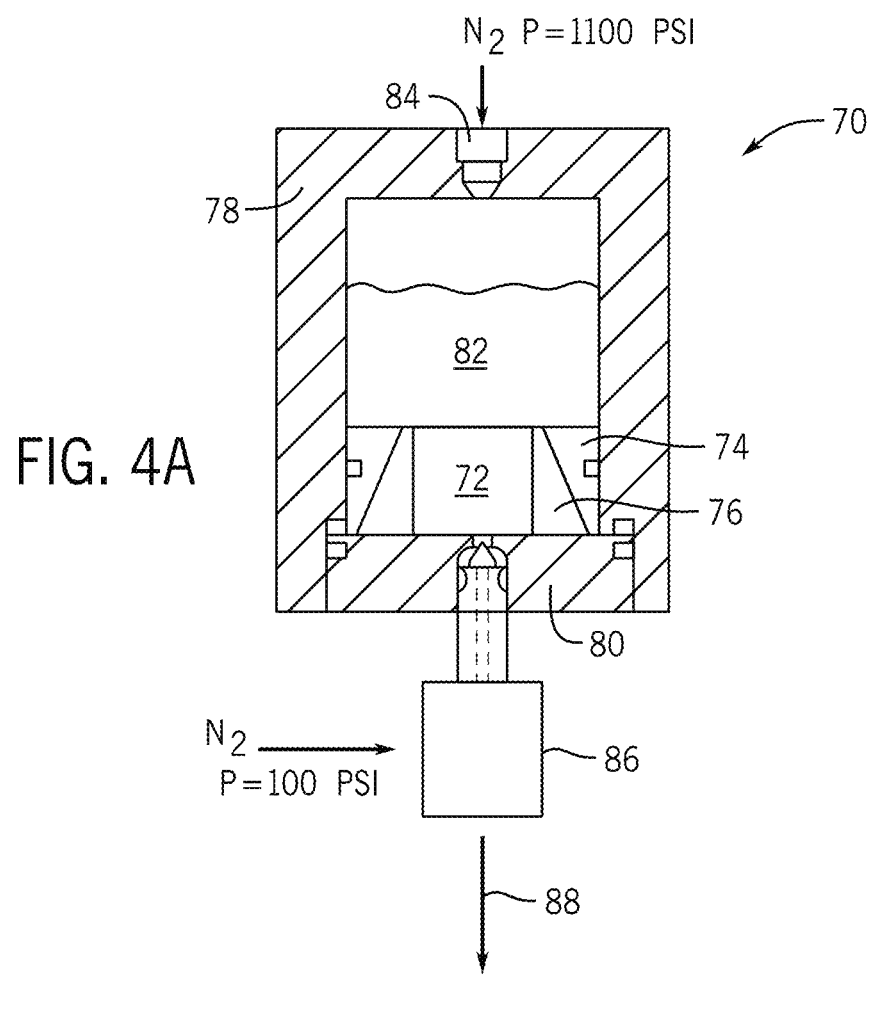
N$_2$ P=1100 PSI
84
78
70
82
74
76
72
FIG. 4A
80
N$_2$ →
P=100 PSI
86
88
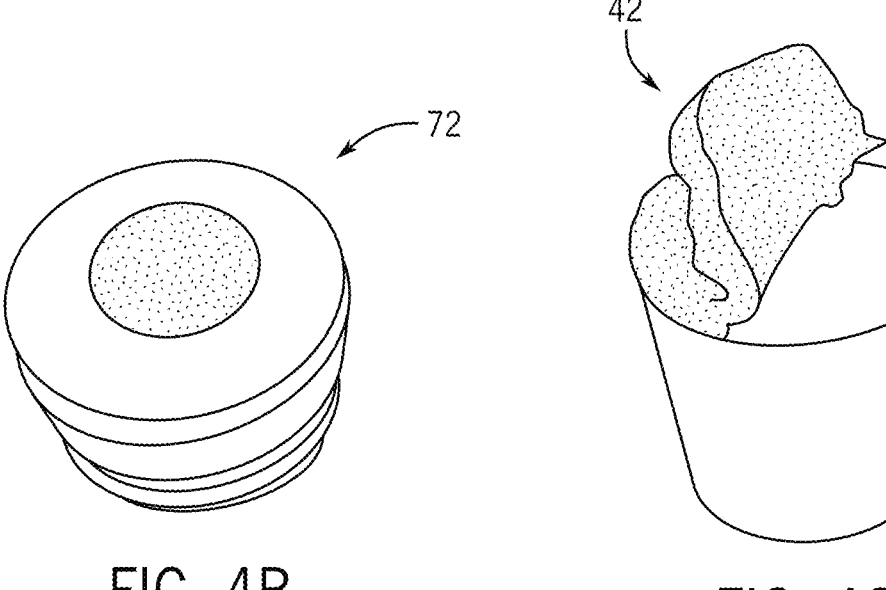
42
72
72
FIG. 4B                    FIG. 4C BORATE–CROSSLINKED GUAR GEL WITH
35 LBM /1000 GAL OF GUAR LOADING.
T=210F.1" BANDERA GRAY
CORE(~10mD (MILLIDARCY))

BORATE–CROSSLINKED GUAR GEL WITH
35 LBM /1000 GAL OF GUAR LOADING.
T=210F.1" BANDERA BUFF
CORE(~200mD (MILLIDARCY))

BORATE–CROSSLINKED GUAR GEL WITH
35 LBM /1000 GAL OF GUAR LOADING.
T=175F.1" BANDERA GRAY
CORE(~200mD (MILLIDARCY))

| FLUID | LOADING OF FIBER TYPE A | T | CORE | PERM mD | A CORE cm2 | SPURT b ml | SLOPE m cm3/min_0.5 | $S_P$ gal/ft2 | $C_L$ ft/min_0.5 | $S_P$ REDUCTION | $C_L$ REDUCTION |
|---|---|---|---|---|---|---|---|---|---|---|---|
| BORATE-CROSSLINKED GUAR GEL WITH 35 LBM/1000 GAL OF GUAR LOADING | 0 | 210F | BANDERA GRAY | 11±1 | 5.07 | 1.72 | 1.31 | 0.084 | 4.23E-03 | – | – |
| | 30 LBM/1000 GALUS | 210F | | | 5.07 | 1.2294 | 1.11 | 0.060 | 3.60E-03 | 28.5% | 15.0% |
| BORATE-CROSSLINKED GUAR GEL WITH 35 LBM/1000 GAL OF GUAR LOADING | 0 | 210F | BUFF BEREA | 200±20 | 5.07 | 3.294 | 1.08 | 0.160 | 3.51E-03 | – | – |
| | 30 LBM/1000 GALUS | 210F | | | 5.07 | 2.7015 | 0.89 | 0.131 | 2.89E-03 | 18% | 17.6% |
| BORATE-CROSSLINKED GUAR GEL WITH 25 LBM/1000 GAL OF GUAR LOADING | 0 | 175F | | | 5.07 | 6.0298 | 1.24 | 0.293 | 4.02E-03 | – | – |
| | 30 LBM/1000 GALUS | 175F | | | 5.07 | 4.8913 | 1.02 | 0.237 | 3.30E-03 | 19% | 17.8% |

FIG. 6

| FLUID | T | CORE | PERM | A CORE | SPURT B | SLOPE M | $S_P$ | $S_L$ | $S_P$ DEVIATION | $C_L$ DEVIATION |
|---|---|---|---|---|---|---|---|---|---|---|
| | | | mD | cm2 | ml | cm3 /min_0.5 | gal/ft2 | ft/min_0.5 | | |
| BORATE-CROSSLINKED GUAR GEL WITH 35 LB /1000 GAL OF GUAR LOADING | 210F | BUFF BEREA | 200±20 | 5.07 | 3.29 | 1.08 | 0.160 | 3.51E-03 | +9% | +5% |
| BORATE-CROSSLINKED GUAR GEL WITH 35 LB /1000 GAL OF GUAR LOADING | | | | | 4.04 | 1.20 | 0.196 | 3.89E-03 | | |

FIG. 7

DEGRADABLE FIBERS FOR WATER SAVINGS IN HYDRAULIC FRACTURING

BACKGROUND

The present disclosure generally relates to introducing degradable fibers into a clean fluid having no proppants contained therein to produce a fiber-containing fluid, and injecting the fiber-containing fluid into a wellbore extending through a subterranean formation during a pad stage of a hydraulic fracturing operation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A field operation can include fracturing of a formation, which can be, for example, a reservoir. As an example, a fracturing operation may be referred to as a fracturing job. Hydraulic fracturing (e.g., a stimulation treatment) may be performed on oil and gas wells in low-permeability reservoirs. For example, engineered fluids (e.g., including chemicals such as surfactants, polymers, polymeric surfactants, etc.) can be pumped at high pressure and rate into a reservoir interval to be treated where fracture generation and/or reopening occurs. As an example, wings of a fracture can extend away from a wellbore in opposing directions, for example, according to the natural stresses within the formation. In conventional propped hydraulic fracturing, a viscous fluid (pad fluid) is injected to generate or propagate a fracture. Certain operations may utilize a proppant, such as grains of sand of a particular size, mixed with treatment fluid to keep the fracture open when the treatment is complete.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes introducing fibers into a clean fluid having no proppants contained therein to produce a fiber-containing fluid. The method also includes injecting the fiber-containing fluid into a wellbore extending through a subterranean formation during a pad stage of a hydraulic fracturing operation.

Certain embodiments of the present disclosure also include a method that includes introducing degradable polylactic acid (PLA) fibers into a clean fluid having no proppants contained therein to produce a fiber-containing fluid. The fiber-containing fluid includes a concentration of the degradable PLA fibers in the clean fluid of 1 to 50 lbm per 1000 GalUS (pound mass per 1000 US gallons). In addition, each degradable PLA fiber of the degradable PLA fibers has a length of 0.5 to 30 millimeters. In addition, each degradable PLA fiber of the degradable PLA fibers has a thickness of 5 to 50 microns. The method also includes injecting the fiber-containing fluid into a wellbore extending through a subterranean formation during a pad stage of a hydraulic fracturing operation. The method further includes detecting, using one or more sensors, one or more operating parameters of the hydraulic fracturing operation in substantially real-time during the hydraulic fracturing operation. In addition, the method includes using a fiber feeder to adjust a type of the degradable PLA fiber used and/or a concentration of the degradable PLA fiber to be added to the clean fluid during the pad stage based at least in part on the one or more operating parameters of the hydraulic fracturing operation in substantially real-time during the hydraulic fracturing operation.

Certain embodiments of the present disclosure also include a fiber feeder configured to introduce fibers into a clean fluid having no proppants contained therein to produce a fiber-containing fluid, and to provide the fiber-containing fluid to a pump to enable pumping of the fiber-containing fluid into a wellbore extending through a subterranean formation during a pad stage of a hydraulic fracturing operation.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIG. 4A illustrates a lab setup that was used to test the effect of fibers in fluids, in accordance with embodiments of the present disclosure;

FIGS. 4B and 4C illustrate a 1 inch core before and after testing, respectively, in the lab setup of FIG. 4A, in accordance with embodiments of the present disclosure;

FIG. 6 includes a table that lists leak-off coefficients $C_L$ extracted from approximation of experimental data by function $V_L(\sqrt{t})$, in accordance with embodiments of the present disclosure;

FIG. 7 includes a table showing repeatability of leak-off coefficients $C_L$, in accordance with embodiments of the present disclosure;

DETAILED DESCRIPTION

Figure 1:
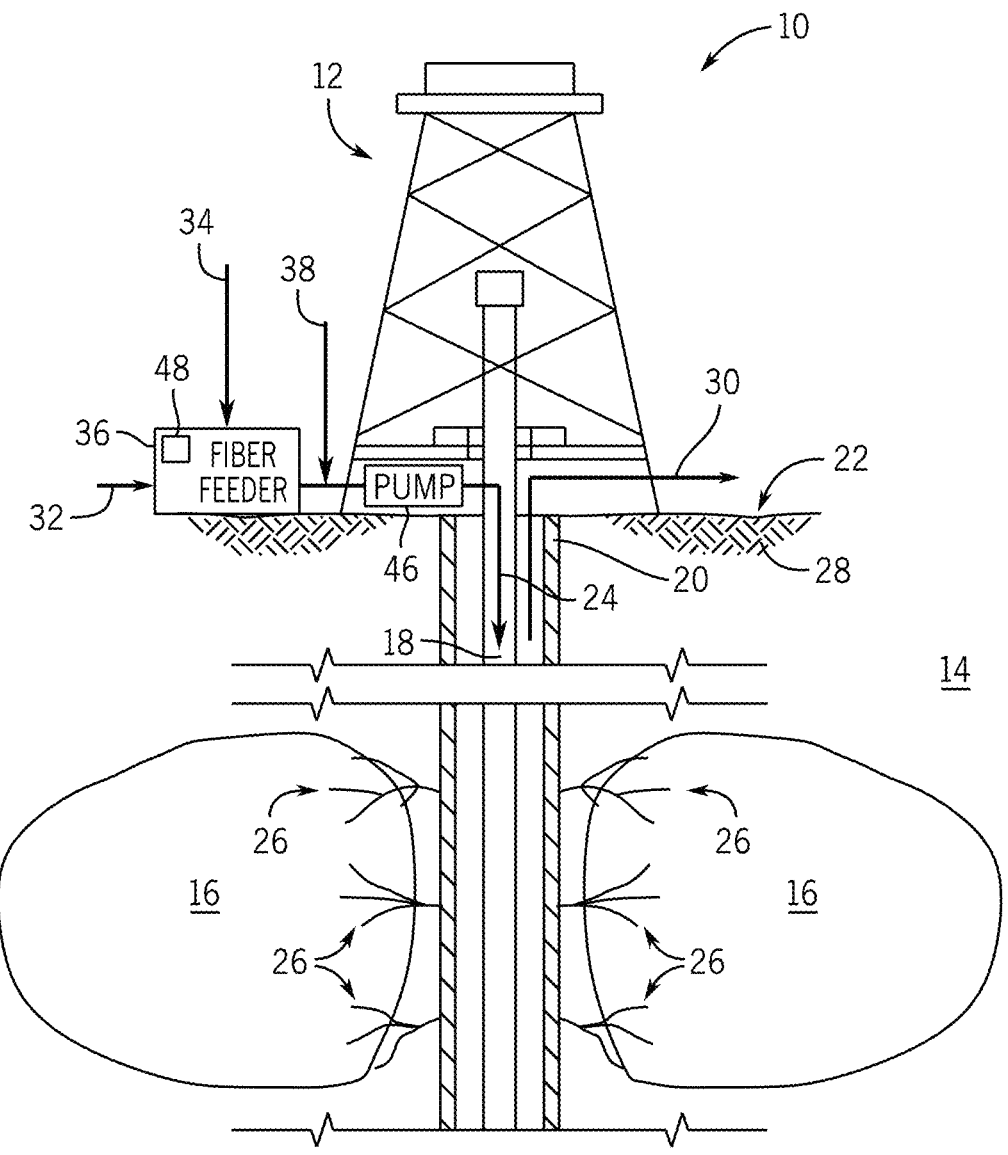
FIG. 1 illustrates a well site having a drilling rig positioned above a subterranean formation that includes one or more oil and/or gas reservoirs, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole," "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

As used herein, a fracture shall be understood as one or more cracks or surfaces of breakage within rock. Fractures can enhance permeability of rocks greatly by connecting pores together and, for that reason, fractures can be induced mechanically in some reservoirs in order to boost hydrocarbon flow. Certain fractures may also be referred to as natural fractures to distinguish them from fractures induced as part of a reservoir stimulation. Fractures can also be grouped into fracture clusters (or "perf clusters") where the fractures of a given fracture cluster (perf cluster) connect to the wellbore through a single perforated zone. As used herein, the term "fracturing" refers to the process and methods of breaking down a geological formation and creating a fracture (i.e., the rock formation around a wellbore) by pumping fluid at relatively high pressures (e.g., pressure above the determined closure pressure of the formation) in order to increase production rates from a hydrocarbon reservoir.

In addition, as used herein, the terms "real time", "real-time", or "substantially real time" may be used interchangeably and are intended to described operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed are caused to be performed, for example, by a process control system (i.e., solely by the process control system, without human intervention).

As discussed above, conventional propped hydraulic fracturing operations utilize a proppant, such as grains of sand of a particular size, mixed with treatment fluid to keep the fracture open when the treatment is complete. In contrast, the embodiments described herein include introducing fibers into a hydraulic fracturing fluid to, for example, block fluid leak-off flow through walls of fractures created during hydraulic fracturing operations. Advantages of the embodiments described herein include the ability to minimize water consumption, as well as minimizing fluid damage to the reservoir.

FIG. 1 illustrates a well site 10 having a drilling rig 12 positioned above a subterranean formation 14 that includes one or more oil and/or gas reservoirs 16. During operation, a derrick and a hoisting apparatus of the drilling rig 12 may raise and lower a drilling string 18 into and out of a wellbore 20 of a well 22 to drill the wellbore 20 into the subterranean formation 14, as well as to position downhole well tools within the wellbore 20 to facilitate completion and production operations of the well 22. For example, in certain operations, a hydraulic fracturing fluid (e.g., a fracturing slurry) may be introduced into the well 22 through the drilling string 18, as illustrated by arrow 24, which may be used to create hydraulic fractures 26 in the subterranean formation 14 to facilitate production of oil and/or gas resources from the well 22. As described in greater detail herein, the produced water and the returned injected hydraulic fracturing fluid may be returned to the surface 28 of the well site 10 (e.g., through the annulus between the drilling string 18 and the wellbore 20), as illustrated by arrow 30.

As discussed above, the embodiments described herein include introducing fibers 32 into a first fluid 34 pumped into a well 22 to, for example, block fluid leak-off flow through walls of hydraulic fractures 26 created during hydraulic fracturing operations. For example, in certain embodiments, a fiber feeder 36 located at the surface 28 of the well site 10 may be used to add fibers 32 "on the fly" into the first fluid 34, which may be pumped into the well 22 at a different time than a second fluid (e.g., hydraulic fracturing fluid containing proppants) 38 is pumped into the well 22. In certain embodiments, a fiber concentration of 1 to 50 lbm per 1000 GalUS may be used, depending on how much reduction of fluid leak-off into the subterranean formation 14 is desired.

Normally, hydraulic fracturing operations are executed as a sequence of two or more stages. During a first stage of hydraulic fracturing, commonly referred to as the "pad stage", a water- or oil-based fluid is pumped into a subterranean formation 14 at sufficiently high pressures and flow rates to create hydraulic fractures 26. Often, the fluid is viscosified during this stage using various thickening agents, and a field operator may control the viscosity to influence the final geometries of the hydraulic fractures 26. In general, a goal of the pad stage is to exceed rock fracture pressure, open hydraulic fractures 26, and "inflate" the hydraulic fractures 26 to achieve enough width.

Immediately and usually continuously following the pad stage is the main stage of hydraulic fracturing operations, commonly referred to as the "propped stage". During conventional hydraulic fracturing operations, this stage usually involves the pumping of a hydraulic fracturing fluid containing either a constant or increasing concentration of conventional proppants. This creates a porous bed of material at the end of the treatment.

Figure 2:
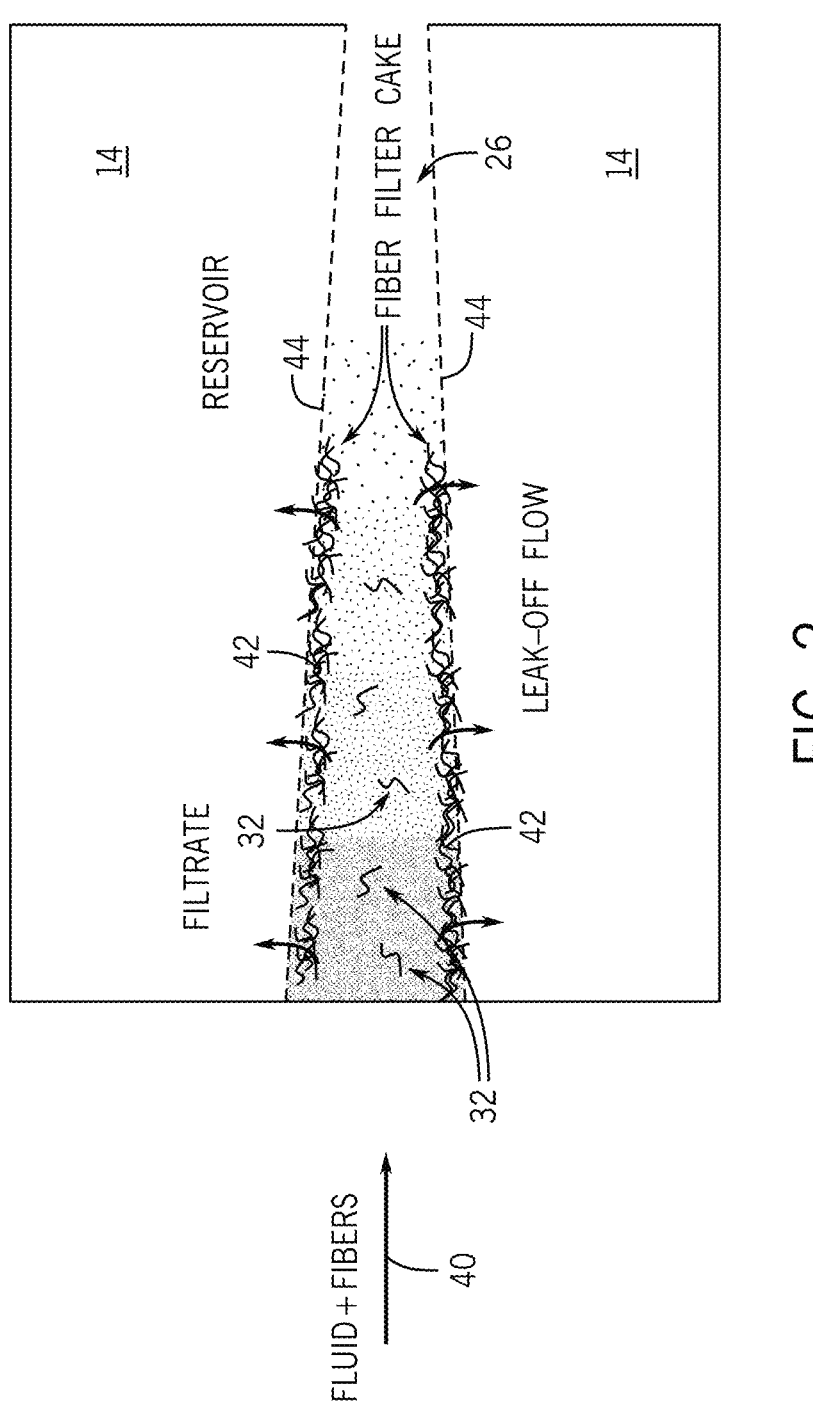
FIG. 2 illustrates how fibers that are added to a fluid may be introduced into hydraulic fractures, in accordance with embodiments of the present disclosure.

FIG. 2 illustrates how fibers 32 that are added to the first fluid 34 may be introduced into hydraulic fractures 26 as a fiber-containing fluid (e.g., as fluid+fibers injection, as illustrated by arrow 40), as described in greater detail herein. In certain embodiments, the fibers 32 may be introduced into the well 22 during a pad stage, when no proppants are being pumped into the well 22. Rather, the first fluid 34 may be a "clean" fluid (e.g., having no proppants contained therein). Rock of the subterranean formation 14 is typically relatively porous, so part of the first fluid 34 containing the fibers 32 may be filtered into the subterranean formation 14. This is an undesirable effect because it leads to several unwanted consequences. One of them is excessive water usage. If fluid filtering (i.e., fluid leak-off) is reduced, then a lower volume of the first fluid may be used during the pad stage to create hydraulic fractures 26 having required widths. In certain embodiments, the size of the fibers 32 may include a length of 0.5 to 30 mm (millimeters) and a thickness of 5 to 50 microns. In general, at this size, the fibers 32 do not penetrate the porous rock of the subterranean formation 14 and may even plug natural fissures up to several millimeters.

Once fibers 32 enter a hydraulic fracture 26, they are gradually filtered out of the fluid conveying them and begin to form fiber filter cake 42 along the walls 44 of the hydraulic fracture 26. Permeability of fiber filter cake 42 is relatively low enough to reduce fluid leak-off significantly (or even plug natural fissures). The reduction in fluid leak-off is beneficial for multiple reasons, not the least of which is reduction in water loss during the pad stage insofar as water is commonly used as the first (e.g., pad stage) fluid 34 used as the delivery fluid of the fibers 32 during the pad stage.

As discussed above, normally, after the pad stage, hydraulic proppants may be pumped into the well 22 using a surface pump 46 during the Propped Stage to perform well production stimulation. In general, the fibers 32 are degradable, which means that they dissolve in the fluid at bottomhole static temperature (BHST) after several days and do not affect the inflow of hydrocarbons from a reservoir within the subterranean formation 14 into the propped fracture 26. As such, another benefit of the fibers 32 described herein is that their degradable nature ensures that the fibers 32 dissolve over time, thereby leading to enhanced hydrocarbon production while also eliminating unnecessary residue within the hydraulic fractures 26 and the subterranean formation 14 on a long-term basis. In certain embodiments, the fibers 32 may include polylactic acid (PLA); however, many other degradable polymers may be used, such as other thermoplastic polyesters. While the fibers 32 described herein may be referred to as water inert polymers, it is noted that the fibers 32 do not include emulsion polymers or latex polymers.

In hydraulic fracturing operations, optimizing the efficiency of fluid usage and enhancing the conductivity of hydraulic fractures 26 are important factors in maximizing well performance. The embodiments described herein achieve these goals by integrating degradable fibers 32 in the pad stage of hydraulic fracturing treatments. One key objective of using degradable fibers 32 is to reduce water consumption during the fracturing process. By incorporating degradable fibers 32, it is possible to achieve the desired fracture geometry and conductivity without the need to increase the pad volume significantly. This reduction in pad volume, or the ability to maintain pad volume while achieving better results, directly contributes to lowering the overall water usage in the hydraulic fracturing operations, which is increasingly important in water-scarce regions and for environmentally sustainable practices.

It will be appreciated that different concentrations of fibers 32 within the first (e.g., pad stage) fluid 34, as well as the particular characteristics of the fibers 32 themselves (e.g., material, length, width, thickness, and so forth) may be chosen based on particular characteristics of the well 22 and/or the subterranean formation 14 and its associated hydrocarbon reservoirs to optimize the hydraulic fracturing treatment. Furthermore, there is an inherent tradeoff between, for example, concentrations of fibers 32 in the first (e.g., pad stage) fluid 34 and resulting fluid leak-off. Therefore, returning to FIG. 1, in certain embodiments, the fiber feeder 36 described herein may be capable of being metered (e.g., using various surface sensors 48, for example, of the fiber feeder 36 itself or of other surface equipment of the well site 10) to continuously monitor concentrations and other parameters of the fibers 32 and the first (e.g., pad stage) fluid 34, and to use this information, as well as various changing operating parameters of the well 22 and/or the subterranean formation 14 (e.g., fluid viscosity, presence of fissures in the rock of the subterranean formation 14, transmissibility of the rock of the subterranean formation 14, permeability of the rock of the subterranean formation 14, and so forth), for example, using downhole sensors to determine, for example, what fiber type is most appropriate (e.g., the particular type of fiber 32; particular physical properties of the particular type of fiber 32 such as length, width, and so forth) that should be used for a particular fracturing job. In addition, in certain embodiments, a control system may be configured to determine how to modify the types of fibers 32 used and/or the first (e.g., pad stage) fluid 34 used including, but not limited to, concentrations of the particular type of fibers 32 in the first (e.g., pad stage) fluid 34, type of first (e.g., pad stage) fluid 34 used, flow rates of the first (e.g., pad stage) fluid 34, and so forth.

Figure 3:
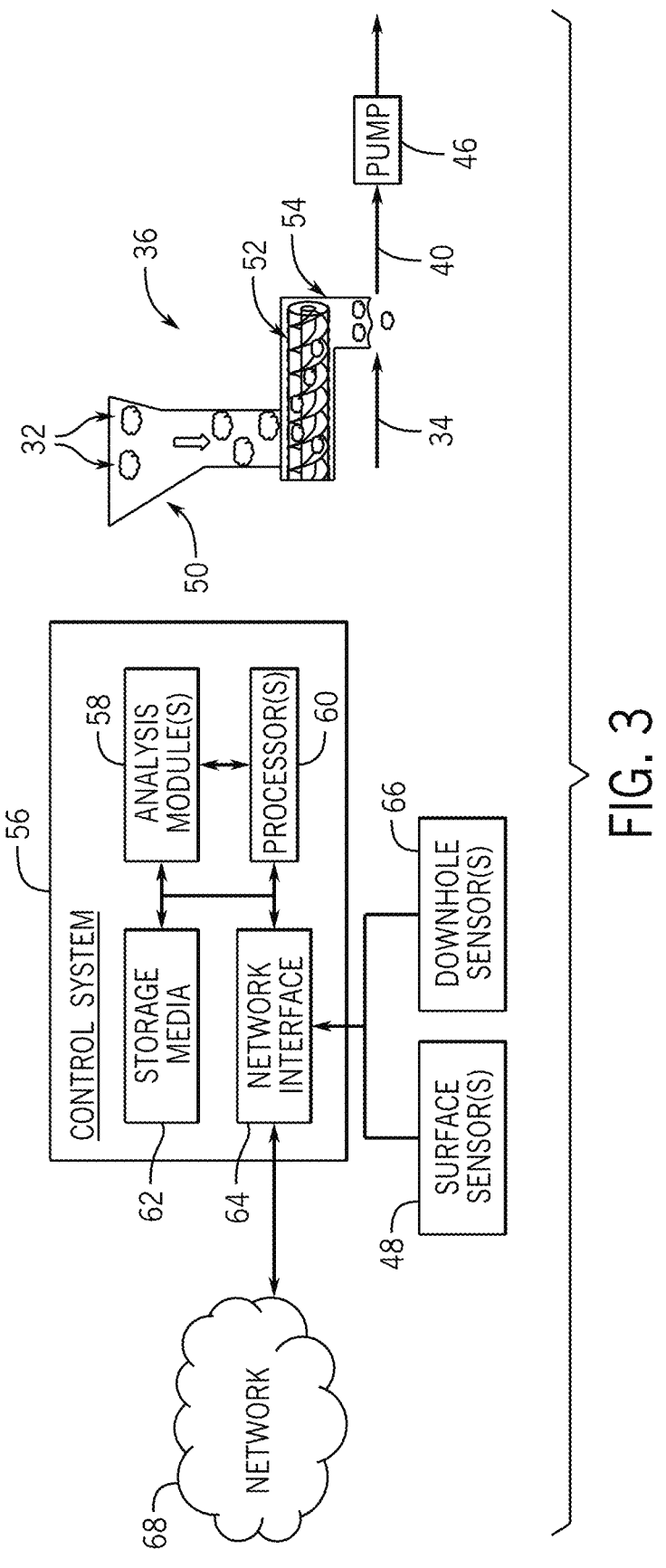
FIG. 3 illustrates various components of a fiber feeder used to introduce fibers into a fluid and associated equipment, in accordance with embodiments of the present disclosure.

As illustrated in FIG. 3, in certain embodiments, the fiber feeder 36 may include a fiber hopper 50 configured to receive the fibers 32, which may be metered through the fiber feeder 36, for example, via a screw auger 52 until the fibers 32 arrive at a fiber discharge 54 where they are introduced into the first (e.g., pad stage) fluid 34 to produce the fiber-containing fluid 40, which may then be pumped into the wellbore 20 using the surface pump 46, as described above with respect to FIG. 1.

As discussed above, in certain embodiments, a control system 56 may be used to control the operations of the fiber feeder 36. For example, in certain embodiments, the control system 56 may include one or more analysis modules 58 (e.g., a program of computer-executable instructions and associated data) that may be configured to perform various functions of the embodiments described herein. In certain embodiments, to perform these various functions, the one or more analysis modules 58 may execute on one or more processors 60 of the control system 56, which may be connected to one or more storage media 62 of the control system 56. Indeed, in certain embodiments, the one or more analysis modules 58 may be stored in the one or more storage media 62.

In certain embodiments, the computer-executable instructions of the one or more analysis modules 58, when executed by the one or more processors 60, may cause the one or more processors 60 to determine how to automatically adjust operating parameters of the fiber feeder 36 including, but not limited to, particular fibers 32 used and concentrations thereof in the first (e.g., pad stage) fluid 34, flow rates of the first (e.g., pad stage) fluid 34, and so forth, based on information received from the various sensors described herein to, for example, maintain a desired leak-off rate, as described in greater detail herein.

In certain embodiments, the one or more processors 60 may include a microprocessor, a microcontroller, a processor module or subsystem, a programmable integrated circuit, a programmable gate array, a digital signal processor (DSP), or another control or computing device. In certain embodiments, the one or more processors 60 may include machine learning and/or artificial intelligence (AI) based processors. In certain embodiments, the one or more storage media 62 may be implemented as one or more non-transitory computer-readable or machine-readable storage media. In certain embodiments, the one or more storage media 62 may include one or more different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 58 may be provided on one computer-readable or machine-readable storage medium of the storage media 62, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 62 may be located either in the machine running the machine-readable instructions or may be located at a remote site from which machine-readable instructions may be downloaded over a network for execution.

In certain embodiments, the processor(s) 60 of the control system 56 may be connected to a network interface 64 of the control system 56 to enable the control system 56 to communicate with various surface sensors 48 (e.g., of surface equipment such as a pump unit used to pump the fluids 34, 38 into the well 22, and so forth) and downhole sensors 66 (e.g., of downhole equipment), as well as other relevant hydraulic fracturing monitoring parameters such as fluid quality assurance/quality control (e.g., of viscosity, pH, and so forth), for the purpose of assisting in the control of the well 22 (e.g., including controlling the type of fibers 32 used and/or characteristics of the first (e.g., pad stage) fluid 34 used in the fiber feeder 36), as described in greater detail herein. In certain embodiments, the network interface 64 may also facilitate the fiber feeder 36 to communicate data to a communication network 68 (e.g., wired and/or wireless communication network) to, for example, archive the data or to enable other external control systems 56 (or other computer systems) to access the data and/or to remotely interact with the fiber feeder 36.

It should be appreciated that the fiber feeder 36 and/or the control system 56 illustrated in FIG. 3 may have more or fewer components than shown, may combine additional components not depicted in the embodiment of FIG. 3, and/or may have a different configuration or arrangement of the components depicted in FIG. 3. In addition, the various components illustrated in FIG. 3 may be implemented in hardware, software, or a combination of both hardware and software, including one or more signal processing and/or application specific integrated circuits. Furthermore, the operations of the control system 56 as described herein may be implemented by running one or more functional modules in an information processing apparatus such as application specific chips, such as application-specific integrated circuits (ASICs), field-programmable gate arrays (FPGAs), programmable logic devices (PLDs), systems on a chip (SOCs), or other appropriate devices. These modules, combinations of these modules, and/or their combination with hardware are all included within the scope of the embodiments described herein.

Lab Tests

Following standard API test procedure 13M-4 (which is identical to ISO 13503-4), the leak-off coefficient was measured for x-linked guar-based fracturing fluids in the presence of degradable PLA fibers type A 32. FIG. 4A illustrates the lab setup 70 that was used, and FIGS. 4B and 4C illustrate a 1" core 72 before and after testing, respectively. As illustrated in FIG. 4A, the core 72 was placed within a cylindrical core holder 74, with a seal 76 disposed between the core 72 and the core holder 74. Then, the core holder 74 was placed within a testing housing 78, for example, by being attached to a removable bottom portion 80 of the testing housing 78, after which an inner volume 82 formed within the testing housing 78 above the core holder 74 (and the core 72) is filled (e.g., through a passage 84 on the top of the testing housing 78) with a fluid that includes PLA fibers 32. For the testing, a higher pressure (e.g., 1100 psi) was maintained in the inner volume 82 of the testing housing 78 than the backpressure 86 (e.g., 100 psi) that is held at the bottom of the testing housing 78, where filtrate 88 comes out. FIG. 4C illustrates the fiber filter cake 42 that formed on the core 72 during testing.

Figures 5A, 5B, 5C:
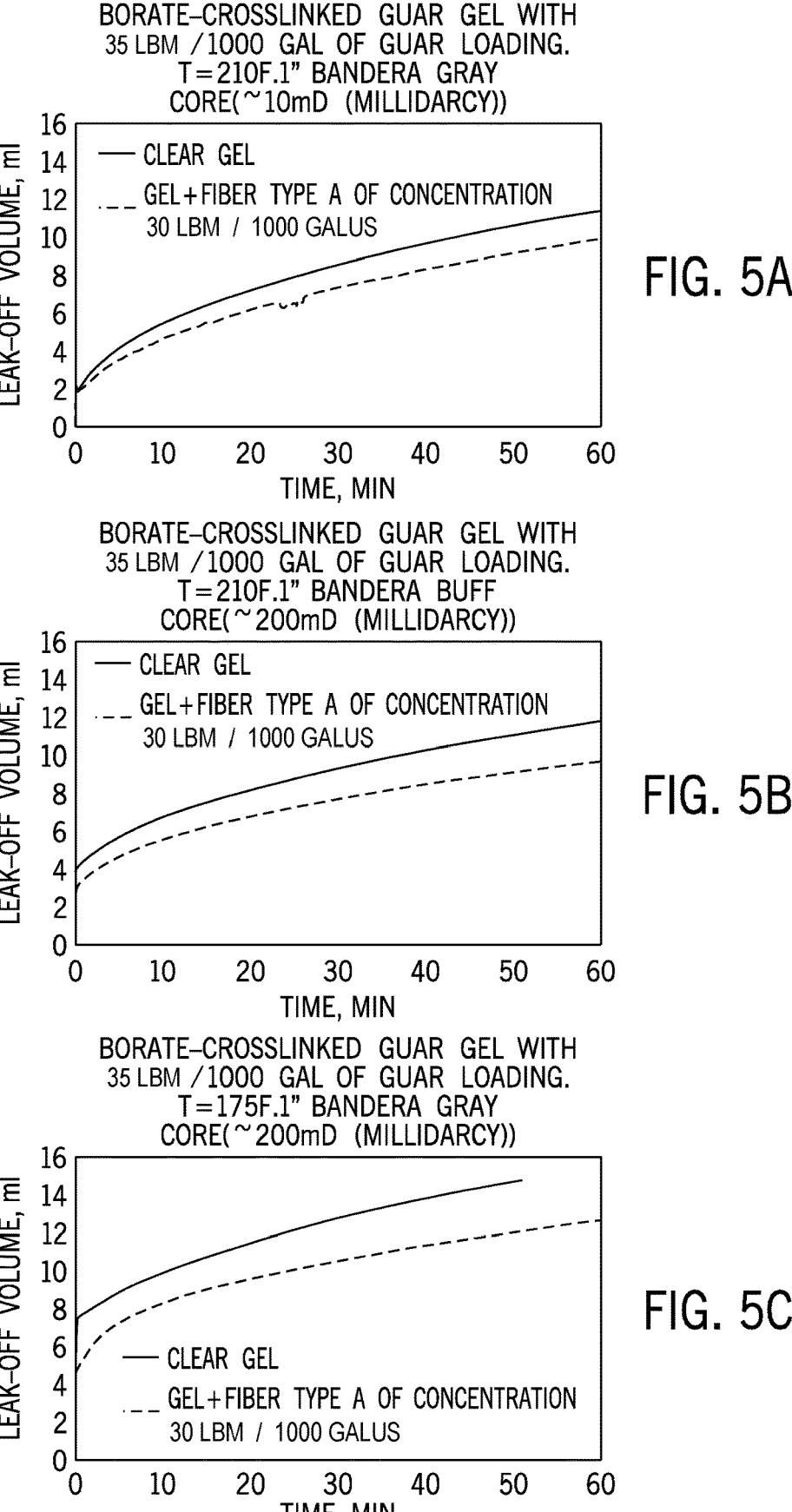
FIGS. 5A through 5C are charts of testing results of leak-off reduction using the lab setup of FIG. 4A, in accordance with embodiments of the present disclosure.

The lab test revealed 15 to 18% reduction of leak-off coefficient $C_L$ at 30 lbm/1000 GalUS of PLA fibers type A 32 for 35 lbm guar loading x-linked gel. The effect was confirmed for two different cores 72 having substantially different permeabilities: (1) Bandera Gray (~10 mD (millidarcy)) and (2) Berea Buff (~200 mD), as well as two different temperatures: (1) 175° F. and 210° F. FIGS. 5A through 5C are charts of the testing results of leak-off reduction.

The leak-off mechanism is revealed to be well described by Carter model $V_L = S_p + 2C_L \sqrt{t}$. FIG. 6 includes a table that lists leak-off coefficients $C_L$ extracted from approximation of experimental data by function $V_L(\sqrt{t})$. As discussed above, average $C_L$ reduction is 17%. In addition, 22% reduction of spurt loss volume $S_p$ was observed. Two tests were performed which showed 10% $C_L$ data deviation for the base fluid. FIG. 7 includes a table showing repeatability of leak-off coefficients $C_L$ measured on the example of x-linked fluid with guar loading.

Reduction of fluid leak-off coefficient $C_L$ should increase efficiency of the fluid used for the pad stage, thereby reducing water consumption of the hydraulic fracture treatment. Efficiency of the fracturing fluid $\eta_e$ may be defined as a ratio of fracture volume Ve (e.g., by the end of a treatment) to total injected slurry volume $V_i$, and may vary within a range 0-100%:

$$\eta_e = \frac{V_e}{V_i}$$

Fluid efficiency is related to leak-off coefficient via equation:

$$\eta_e = \frac{w_e}{w_e + 2KC_L\sqrt{t_e} + 2S_P},$$

where $w_e$ is the fracture width by end of pumping, K is an opening-time distribution factor, $t_e$ is a time of an end of pumping, $S_p$ is the spurt loss of fluid into the subterranean formation 14.

The equations clearly show that reducing the leak-off coefficient $C_L$ leads to increased fluid efficiency. Efficiency increases also may be estimated from a well treatment based on pressure match analysis. As is shown below with respect to the examples of wells A-E, application of a fiber type A enabled confirmation of fluid efficiency increases from approximately 8.6% to approximately 34.6%.

Example Fiber Materials

Figure 8A:
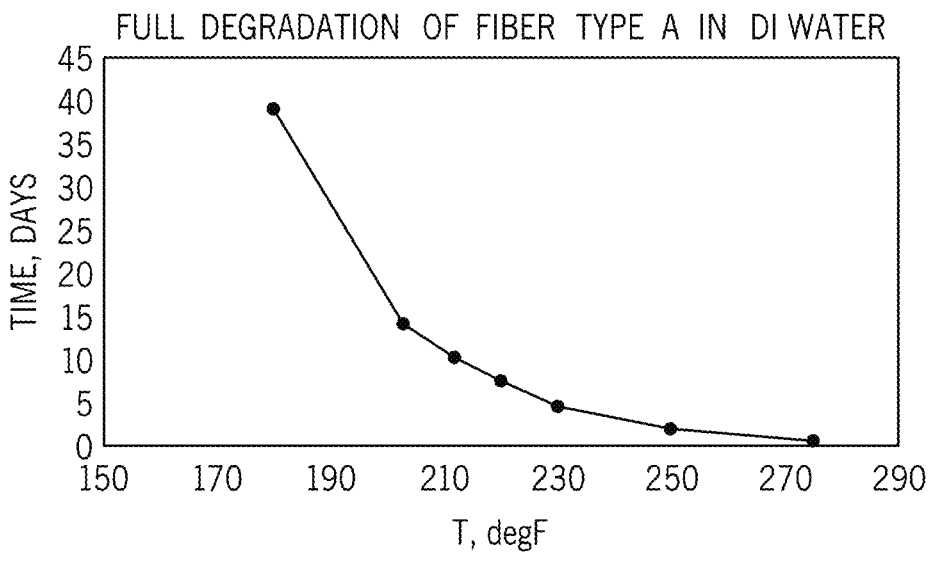
FIG. 8A illustrates a graph of typical PLA fiber degradation relative to temperature, in accordance with embodiments of the present disclosure.
Figure 8B:
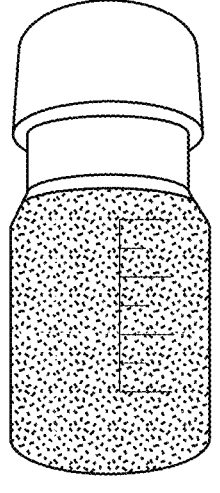
FIGS. 8B and 8C illustrate a bottle full of fibers before and after dissolution, respectively, in accordance with embodiments of the present disclosure.
Figure 8C:
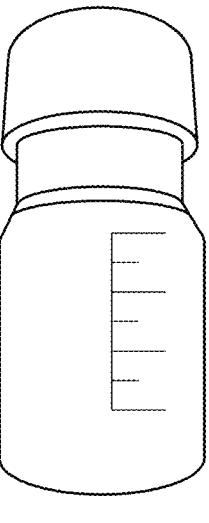

As described herein, PLA fibers 32 are degradable, which means they get dissolved in fluid at BHST after several days and do not affect hydrocarbon inflow from reservoir(s) of a subterranean formation 14 to a propped fracture 26. FIG. 8A illustrates a graph of typical PLA fiber type A degradation relative to temperature, and FIGS. 8B and 8C illustrate a bottle full of fibers 32 before and after dissolution, respectively. In certain embodiments, the raw material of the PLA fibers 32 may be NatureWorks™ PLA 6201D or Nature-Works™ PLA 6202D. In certain embodiments, the PLA fibers 32 may be drawn and covered by a finish agent. In certain embodiments, the PLA fibers 32 used may be approximately 99% of the PLA polymer, 0.5% of water, and 0.5% of the finish agent, which provides fiber dispersibility in water required for pumpability. In addition, in certain embodiments, the fiber length may vary from approximately 0.5 to 30 mm. It has been found that the fiber degrades in about 1 day at 121° C. (e.g., approximately 250° F.) and in about 2 months at 79.4° C. (e.g., approximately 175° F.).

Example of polymers (not only PLA), which can be used as raw material for the degradable fibers 32 described herein may be found in U.S. Pat. No. 8,657,002, which describes potential dissolvable materials that may potentially be used for fibers at typical downhole conditions, and the disclosure of which is incorporated herein in its entirety. Other references that disclose dissolvable materials suitable for use as fibers include U.S. Pat. Nos. 4,848,467; 4,957,165; and 4,986,355, as well as U.S. Patent Application Publication Numbers 2003/002195 and 2004/0152601, the disclosures for each are also incorporated herein in their entireties.

Suitable materials for the fibers 32 described herein include substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures thereof.

Furthermore, other materials for the fibers 32 described herein include solid cyclic dimers, or solid polymers, of certain organic acids, that hydrolyze under known and controllable conditions of temperature, time and pH; the degradation products are organic acids. One example of a suitable material is the solid cyclic dimer of lactic acid (known as "lactide"), which has a melting point of 95 to 125° C. (depending upon the optical activity). As described in greater detail herein, another is a polymer of lactic acid (sometimes called PLA, or a polylactate, or a polylactide).

Another example is the solid cyclic dimer of glycolic acid (known as "glycolide"), which has a melting point of approximately 86° C. Yet another example is a polymer of glycolic acid (hydroxyacetic acid), also known as polyglycolic acid ("PGA"), or polyglycolide. Another example is a copolymer of lactic acid and glycolic acid.

Well Tests

The analysis described below focuses on evaluating the impact of using degradable fibers 32 in the pad stage across five different wells (Wells A, B, C, D, and E). The wells were initially designed using conventional hydraulic fracturing techniques, and later executed with the inclusion of degradable fibers 32 in the pad stage. By comparing key performance metrics such as fluid efficiency and water usage before and after the introduction of degradable fibers 32, a goal was to assess the effectiveness of the embodiments described herein in improving fracture treatments while reducing water consumption. The following information provides a detailed comparison for each well, highlighting the changes in fluid efficiency and the impact on water usage, and analyzes the overall benefits of using degradable fibers 32 in the fracturing process. It should be noted that fiber concentration varied from between 5 to 10 lbm/1000 GalUS.

As introduced above, fluid efficiency is a parameter related to fluid leak-off into a subterranean formation 14. In general:

High leak-off leads to relatively low fluid efficiency
Low leak-off leads to relatively high fluid efficiency
If leak-off is zero, then efficiency is 100%
Low efficiency of slurry is an undesirable effect, because more fluid (and filtrate to the subterranean formation 14) needs to be pumped to maintain the same fracture volume Well A:
  Initial Design (Conventional):
    Fluid Efficiency: 13.6%
  Executed (Degradable Fibers 32 in the pad stage):
    Fluid Efficiency: 34.0%
Well B:
  Initial Design (Conventional):
    Fluid Efficiency: 9.8%
  Executed (Degradable Fibers 32 in the pad stage):
    Fluid Efficiency: 35.0%
Well C:
  Initial Design (Conventional):
    Fluid Efficiency: 4.0%
  Executed (Conventional with Degradable Fibers 32 in the pad stage):
    Fluid Efficiency: 36.0%

11

Well D:
Initial Design (Conventional):
Fluid Efficiency: 6.4%
Executed (Conventional with Degradable Fibers 32 in the pad stage):
Fluid Efficiency: 29.0%
Well E:
Initial Design (Conventional):
Fluid Efficiency: 9.2%
Executed (Conventional with Degradable Fibers 32 in the pad stage):
Fluid Efficiency: 39.0%
Summary of Degradable Fibers Impact on Fluid Efficiency:
Across the wells, the introduction of degradable fibers 32 generally resulted in an increase in fluid efficiency. This suggests that degradable fibers 32 can enhance fluid utilization and improve the efficiency of fracture propagation.

So, in conclusion, in general, the use of degradable fibers 32 in the pad stage has shown to improve fluid efficiency, although the degree of improvement varies by well. While degradable fibers 32 generally enhance fluid efficiency and reduce water consumption, the specific outcomes may depend on various factors such as fracture complexity and the overall treatment design. As such, the decision to use degradable fibers 32 may be carefully weighed against the specific objectives of the fracture treatment.

Figure 9:
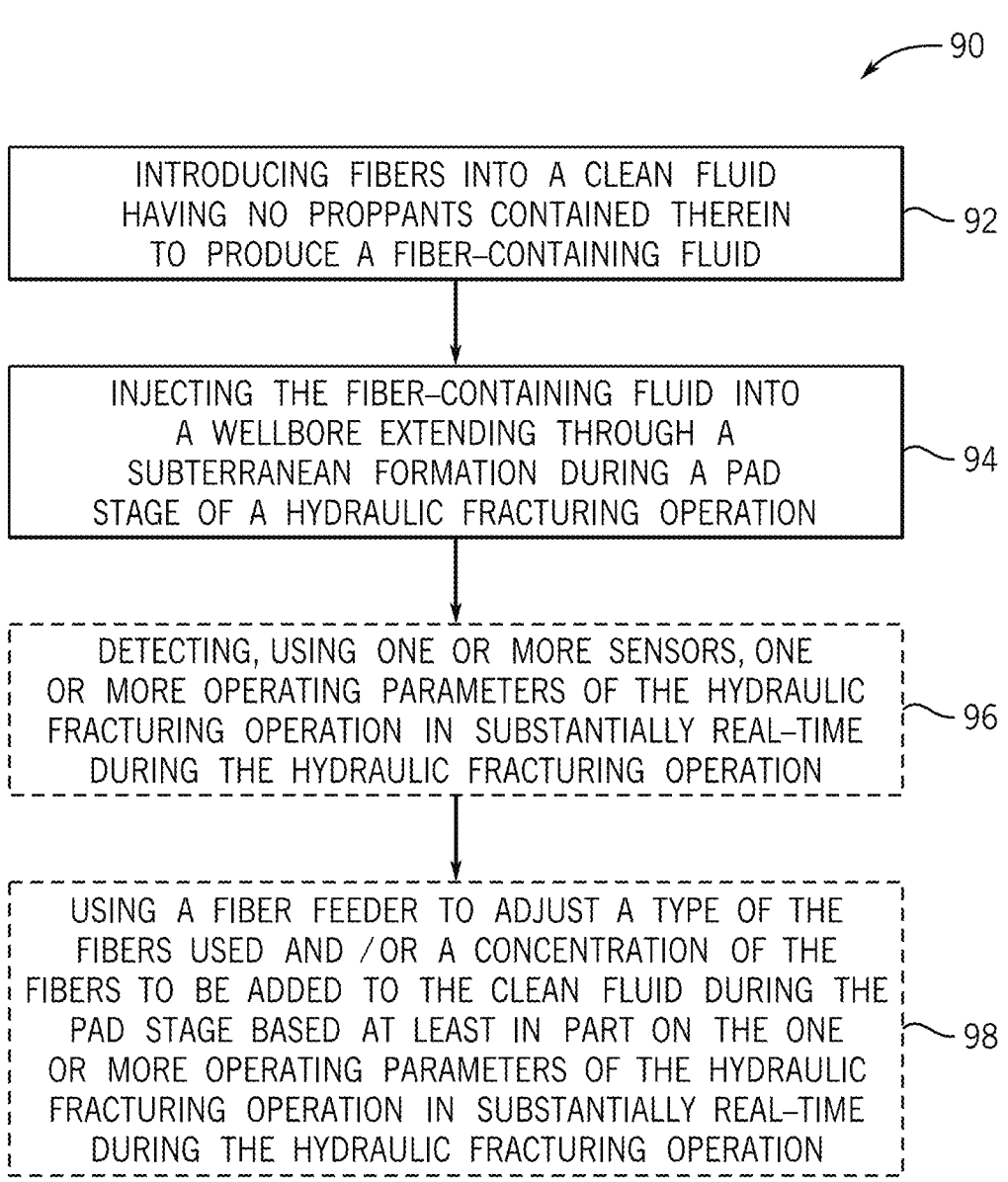
FIG. 9 illustrates a flow diagram of a method of utilizing the embodiments described herein.

FIG. 9 illustrates a flow diagram of a method 90 of utilizing the embodiments described herein. As illustrated in FIG. 9, in certain embodiments, the method 90 may include introducing fibers 32 into a clean fluid 34 having no proppants contained therein to produce a fiber-containing fluid 40 (block 92). In addition, in certain embodiments, the method 90 may include injecting the fiber-containing fluid 40 into a wellbore 20 extending through a subterranean formation 14 during a pad stage of a hydraulic fracturing operation (block 94).

In addition, in certain embodiments, the method 90 may alternatively include detecting, using one or more sensors 48, 66, one or more operating parameters of the hydraulic fracturing operation in substantially real-time during the hydraulic fracturing operation (block 96). In addition, the method 90 may alternatively include using a fiber feeder 36 to adjust a type of the fibers 32 used and/or a concentration of the fibers 32 to be added to the clean fluid 34 during the pad stage based at least in part on the one or more operating parameters of the hydraulic fracturing operation in substantially real-time during the hydraulic fracturing operation (block 98). In such embodiments, the one or more operating parameters of the hydraulic fracturing operation may include, among other operating parameters, fluid viscosity, presence of fissures in rock of the subterranean formation 14, transmissibility of the rock of the subterranean formation 14, permeability of the rock of the subterranean formation 14, and so forth.

In addition, in certain embodiments, the fiber-containing fluid 40 may include a concentration of the fibers in the clean fluid of 1 to 50 lbm/1000 GalUS. In addition, in certain embodiments, each fiber 32 of the fibers 32 may have a length of 0.5 to 30 millimeters. In addition, in certain embodiments, each fiber 32 of the fibers 32 may have a thickness of 5 to 50 microns. In addition, in certain embodiments, each fiber 32 of the fibers 32 may consist essentially of polylactic acid (PLA). In addition, in certain embodiments, the fibers 32 may be selected from the group consisting of substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxy carboxylic acid-containing moieties, and mixtures thereof.

In addition, in certain embodiments, the fibers 32 are configured to form a fiber filter cake 42 along walls 44 of hydraulic fractures 26 extending from the wellbore 20 into the subterranean formation 14. In addition, in certain embodiments, the fiber filter cake 42 reduces fluid leak-off through the walls 44 of the hydraulic fractures 26. In addition, in certain embodiments, the fibers 32 are configured to degrade over time after forming the fiber filter cake 42 along the walls 44 of the hydraulic fractures 26.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

The invention claimed is:

1. A method, comprising:
introducing fibers into a clean fluid having no proppants contained therein to produce a fiber-containing fluid;
injecting the fiber-containing fluid into a wellbore extending through a subterranean formation during a pad stage of a hydraulic fracturing operation, wherein the fibers are configured to form a fiber filter cake along walls of fractures extending from the wellbore into the subterranean formation;
detecting, using one or more sensors, one or more operating parameters of the hydraulic fracturing operation in substantially real-time during the hydraulic fracturing operation; and
using a fiber feeder to adjust at least one of a type of the fibers used or a concentration of the fibers to be added to the clean fluid during the pad stage based at least in part on the one or more operating parameters of the hydraulic fracturing operation in substantially real-time during the hydraulic fracturing operation to control a leak-off rate through the walls of the fractures.

2. The method of claim 1, wherein the fiber-containing fluid comprises a concentration of the fibers in the clean fluid of 1 pound mass to 50 pound mass per 1000 US gallons.

3. The method of claim 1, wherein each fiber of the fibers has a length of 0.5 millimeters to 30 millimeters.

4. The method of claim 1, wherein each fiber of the fibers has a thickness of 5 microns to 50 microns.

5. The method of claim 1, wherein each fiber of the fibers consists essentially of polylactic acid.

6. The method of claim 1, wherein the fibers are selected from the group consisting of substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

7. The method of claim 1, wherein the fiber filter cake reduces fluid leak-off through the walls of the fractures.

8. The method of claim 1, wherein the fibers are configured to degrade over time after forming the fiber filter cake along the walls of the fractures.

9. The method of claim 1, wherein the one or more operating parameters of the hydraulic fracturing operation comprise fluid viscosity, presence of fissures in rock of the subterranean formation, transmissibility of the rock of the subterranean formation, permeability of the rock of the subterranean formation, or any combination thereof.

10. A method, comprising:
introducing degradable polylactic acid (PLA) fibers into a clean fluid having no proppants contained therein to produce a fiber-containing fluid, wherein the fiber-containing fluid comprises a concentration of the degradable PLA fibers in the clean fluid of 1 pound mass to 50 pound mass per 1000 US gallons, wherein each degradable PLA fiber of the degradable PLA fibers has a length of 0.5 millimeters to 30 millimeters, and wherein each degradable PLA fiber of the degradable PLA fibers has a thickness of 5 microns to 50 microns;
injecting the fiber-containing fluid into a wellbore extending through a subterranean formation during a pad stage of a hydraulic fracturing operation, wherein the degradable PLA fibers are configured to form a fiber filter cake along walls of fractures extending from the wellbore into the subterranean formation;
detecting, using one or more sensors, one or more operating parameters of the hydraulic fracturing operation in substantially real-time during the hydraulic fracturing operation; and
using a fiber feeder to adjust at least one of a type of the degradable PLA fibers used or a concentration of the degradable PLA fibers to be added to the clean fluid during the pad stage based at least in part on the one or more operating parameters of the hydraulic fracturing operation in substantially real-time during the hydraulic fracturing operation to control a leak-off rate through the walls of the fractures.

11. The method of claim 10, wherein the one or more operating parameters of the hydraulic fracturing operation comprise fluid viscosity, presence of fissures in rock of the subterranean formation, transmissibility of the rock of the subterranean formation, permeability of the rock of the subterranean formation, or any combination thereof.

12. The method of claim 10, wherein the fiber filter cake reduces fluid leak-off through the walls of the fractures.

13. The method of claim 10, wherein:
the one or more operating parameters of the hydraulic fracturing operation comprise fluid viscosity, presence of fissures in rock of the subterranean formation, transmissibility of the rock of the subterranean formation, permeability of the rock of the subterranean formation, or any combination thereof,
the one or more sensors comprise surface sensors and downhole sensors,
the fiber feeder comprises a fiber hopper, a screw auger, and a fiber discharge to introduce the degradable PLA fibers into the clean fluid, and
the fiber filter cake reduces fluid leak-off through the walls of the fractures by reducing a leak-off coefficient by 15% to 18%.

14. A fiber feeder configured to:
introduce fibers into a clean fluid having no proppants contained therein to produce a fiber-containing fluid;
provide the fiber-containing fluid to a pump to enable pumping of the fiber-containing fluid into a wellbore extending through a subterranean formation during a pad stage of a hydraulic fracturing operation, wherein the fibers are configured to form a fiber filter cake along walls of fractures extending from the wellbore into the subterranean formation;
receive, from one or more sensors, one or more operating parameters of the hydraulic fracturing operation in substantially real-time during the hydraulic fracturing operation; and
adjust one or more properties of at least one of the fibers or the clean fluid based at least in part on the one or more operating parameters of the hydraulic fracturing operation in substantially real-time during the hydraulic fracturing operation to control a leak-off rate through the walls of the fractures.

15. The fiber feeder of claim 14, wherein the one or more operating parameters of the hydraulic fracturing operation comprise fluid viscosity, presence of fissures in rock of the subterranean formation, transmissibility of the rock of the subterranean formation, permeability of the rock of the subterranean formation, or some combination thereof.

\* \* \* \* \*